(12) United States Patent
Brown et al.

(10) Patent No.: US 8,326,214 B2
(45) Date of Patent: *Dec. 4, 2012

(54) RESPONDING TO RECIPIENT RATED WIRELESSLY BROADCAST ELECTRONIC WORKS

(75) Inventors: Michael Wayne Brown, Georgetown, TX (US); Michael A. Paolini, Austin, TX (US); Newton James Smith, Jr., Austin, TX (US); Cornell G. Wright, Jr., Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/194,563

(22) Filed: Jul. 29, 2011

(65) Prior Publication Data

US 2011/0287709 A1    Nov. 24, 2011

Related U.S. Application Data

(63) Continuation of application No. 12/056,075, filed on Mar. 26, 2008, now Pat. No. 8,041,293, which is a continuation of application No. 10/728,164, filed on Dec. 4, 2003, now Pat. No. 7,515,873.

(51) Int. Cl.
*H04H 20/71* (2008.01)
(52) U.S. Cl. .... 455/3.01; 455/419; 455/2.01; 455/414.1
(58) Field of Classification Search ................ 455/3.01, 455/419, 2.01, 414.1, 3.03, 3.06, 418, 420, 455/414.2, 3.02; 705/26, 14; 704/270, 200.1
See application file for complete search history.

(56) References Cited

U.S. PATENT DOCUMENTS

| | | | |
|---|---|---|---|
| 5,247,293 | A | 9/1993 | Nakagawa |
| 6,356,934 | B1 | 3/2002 | Delph |
| 7,027,832 | B2 | 4/2006 | Gum |
| 7,203,456 | B1 | 4/2007 | Beard et al. |
| 7,515,873 | B2 | 4/2009 | Brown |
| 7,519,322 | B2 | 4/2009 | Brown |
| 7,620,362 | B2 | 11/2009 | Brown |
| 8,041,290 | B2 | 10/2011 | Brown et al. |
| 2002/0040255 | A1 | 4/2002 | Neoh |
| 2002/0067805 | A1 | 6/2002 | Andrews |

(Continued)

FOREIGN PATENT DOCUMENTS

CN        1371056 A      9/2002

(Continued)

OTHER PUBLICATIONS

Non-final Office Action, U.S. Appl. No. 13/197,206, filed Aug. 3, 2011, Michael Wayne Brown et al, mailing date Dec. 2, 2011, 21 pages.

(Continued)

*Primary Examiner* — John J Lee
(74) *Attorney, Agent, or Firm* — David A. Mims, Jr.; Amy J. Pattillo

(57) ABSTRACT

A secondary player receives a wireless broadcast of an electronic work from a primary player. Responsive to a playback of the electronic work from the secondary player, the secondary player requires a recipient of the electronic work to rate the electronic work. Responsive to the recipient rating the electronic work or an automatic rating selection made based on the recipient's preferences, the options available to the recipient may be dynamically adjusted.

18 Claims, 9 Drawing Sheets

U.S. PATENT DOCUMENTS

| | | | |
|---|---|---|---|
| 2002/0074413 A1 | 6/2002 | Henzerling | |
| 2002/0080168 A1 | 6/2002 | Hilliard et al. | |
| 2002/0126135 A1 | 9/2002 | Ball et al. | |
| 2002/0132585 A1 | 9/2002 | Palermo | |
| 2002/0161835 A1 | 10/2002 | Ball et al. | |
| 2002/0168938 A1 | 11/2002 | Chang | |
| 2002/0184038 A1* | 12/2002 | Costello et al. | 704/500 |
| 2003/0002849 A1 | 1/2003 | Lord | |
| 2003/0024375 A1 | 2/2003 | Sitrick | |
| 2003/0073432 A1 | 4/2003 | Meade, II | |
| 2003/0073460 A1 | 4/2003 | van Pelt | |
| 2003/0083013 A1 | 5/2003 | Mowery et al. | |
| 2003/0108164 A1 | 6/2003 | Laurin et al. | |
| 2004/0058662 A1 | 3/2004 | Gieske et al. | |
| 2004/0153767 A1 | 8/2004 | Dolgonos | |
| 2004/0248603 A1 | 12/2004 | Canoy | |
| 2005/0004873 A1* | 1/2005 | Pou et al. | 705/51 |
| 2005/0086683 A1 | 4/2005 | Meyerson | |
| 2005/0125221 A1 | 6/2005 | Brown et al. | |
| 2005/0125222 A1 | 6/2005 | Brown | |
| 2005/0125302 A1 | 6/2005 | Brown et al. | |
| 2006/0053080 A1 | 3/2006 | Edmonson et al. | |
| 2006/0253585 A1 | 11/2006 | Fein et al. | |
| 2007/0178830 A1 | 8/2007 | Janik et al. | |
| 2008/0176507 A1 | 7/2008 | Brown | |
| 2008/0177549 A1 | 7/2008 | Brown | |
| 2011/0289213 A1 | 11/2011 | Brown et al. | |

FOREIGN PATENT DOCUMENTS

| | | |
|---|---|---|
| JP | PUPA 09-160899 | 6/1997 |
| JP | PUPA 2001-344369 | 12/2001 |
| JP | PUPA 2002-133062 | 5/2002 |
| JP | PUPA 2002-203070 | 7/2002 |
| JP | PUPA 2002-259605 | 9/2002 |
| JP | PUPA 2002-262227 | 9/2002 |
| JP | PUPA 2003-198544 | 7/2003 |
| JP | PUPA 2003-228657 | 8/2004 |
| JP | PUPA 2005-514703 | 5/2005 |

OTHER PUBLICATIONS

U.S. Appl. No. 12/057,248, filed Mar. 27, 2008, Michael Wayne Brown, Notice of Allowance, mailed Jun. 10, 2011, 10 pages.

U.S. Appl. No. 12/057,248, filed Mar. 27, 2008, Michael Wayne Brown, Office Action, mailed Jan. 7, 2011, 16 pages.

U.S. Appl. No. 12/056,075, filed Mar. 26, 2008, Michael Wayne Brown, Notice of Allowance, mailed Jun. 10, 2011, 10 pages.

U.S. Appl. No. 12/056,075, filed Mar. 26, 2008, Michael Wayne Brown, Office Action, mailed Jan. 6, 2011, 15 pages.

US Patent 7515873, issued Apr. 7, 2009, Office Action, mailed Apr. 15, 2008, 5 pages.

US Patent 7515873, issued Apr. 7, 2009, Notice of Allowance, mailed Sep. 9, 2008, 6 pages.

US Patent 7519322, issued Apr. 14, 2009, Office Action, mailed Apr. 15, 2008, 5 pages US Patent 7519322, issued Apr. 14, 2009, Notice of Allowance, mailed Sep. 5, 2008, 6 pages.

US Patent 7620362, issued Nov. 17, 2009, Office Action, mailed Nov. 2, 2007, 9 pages.

US Patent 7620362, issued Nov. 17, 2009, Office Action, mailed Jul. 18, 2008, 5 pages.

US Patent 7620362, issued Nov. 17, 2009, Office Action, mailed Jan. 8, 2009, 6 pages.

US Patent 7620362, issued Nov. 17, 2009, Notice of Allowance, mailed Jul. 9, 2009, 6 pages.

Notice of Allowance, U.S. Appl. No. 13/197,206, filed Aug. 3, 2011, Michael Wayne Brown et al, mailing date Apr. 9, 2012, 17 pages.

* cited by examiner

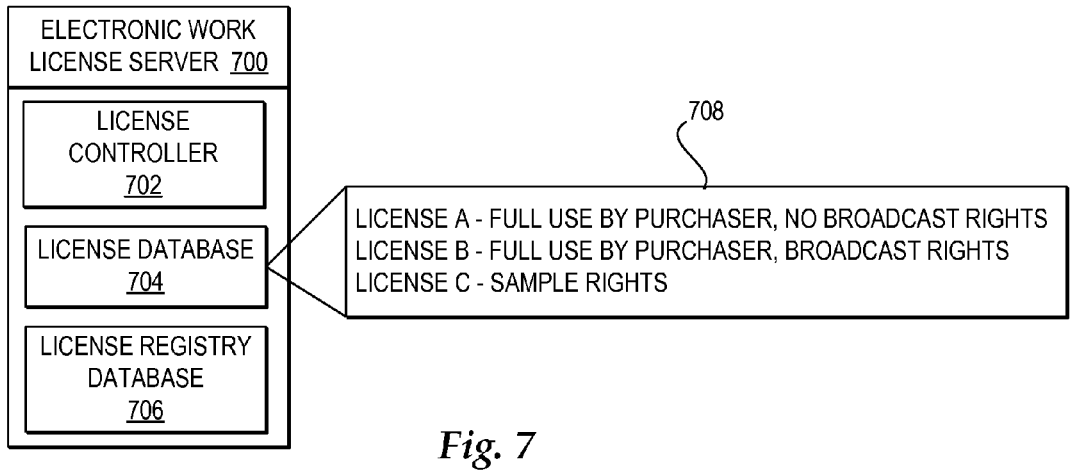

*Fig. 7*

| Do you authorize sending your music preferences to player A?<br><br>Yes   No | Would you like to listen to song 5, artist 4 broadcast from player A?<br><br>Yes   No | Would you like to store a sample of song 5, artist 4 broadcast from player A?<br><br>Yes   No |
|---|---|---|
| *Fig. 8A* | *Fig. 8B* | *Fig. 8C* |

| What is your rating of song 5, artist 4?<br><br>Poor<br>1 2 3 4 5<br>6 7 8 9 10<br>Great | Would you like to preview purchasing options for song 5, artist 4?<br><br>Yes   No |
|---|---|
| *Fig. 8D* | *Fig. 8E* |

RESPONDING TO RECIPIENT RATED WIRELESSLY BROADCAST ELECTRONIC WORKS

CROSS-REFERENCE TO RELATED APPLICATIONS

This application is a continuation of commonly assigned U.S. patent application Ser. No. 12/056,075, filed Mar. 26, 2008, which is a continuation of U.S. Pat. No. 7,515,873, filed Dec. 4, 2003, which are hereby incorporated herein by reference.

BACKGROUND OF THE INVENTION

1. Technical Field

The present invention relates in general to improved broadcasting systems and in particular to an improved rating response system for recipient rated wirelessly broadcast electronic works. Still more particularly, the present invention relates to selecting electronic works to broadcast based on previous ratings by a recipient of wirelessly broadcast electronic works and offering purchase options to a recipient of a wirelessly broadcast electronic work rated affirmatively by the recipient.

2. Description of the Related Art

Technological advancements in portable computer systems enable display and audio output of copyrightable works in an electronic form. These electronic works include, but are not limited to, music, film, video, and books. The technological advances, for example, continue to expand the types of electronic devices that play music and video. Further, technological advances are providing new ways of encapsulating music and video and new ways of distributing music and video.

In particular, one of the advances in devices that play electronic works is in portable electronic devices that play music from MPEG-1 Layer 3 (MP3) and other types of electronic compression file formats. MP3 files are typically small in memory size and thus are ideal for storage and play on portable electronic devices. Further, MP3 and other types of electronic formats of licensed works are often easily transferable from one device to another via a wire or wireless network. Further, music files may be streamed from one portable device to another creating a type of ad-hoc radio system.

As sharing of electronic works between users proliferates, users often receive copies of electronic works without the proper licenses. In some cases, recipients do not intend to acquire proper licensing. In other cases, however, recipients acquire copies of electronic works to sample the works and decide if they would like to purchase the work. Thus, it would be advantageous to prompt a user receiving a sample work to rate the work and prompt the user to purchase the work if the user gives the work a favorable rating.

Further, in the typical file sharing system, when electronic works are shared between users, it is typical for one user to view the electronic work catalog of the other user and request a copy of a specific work. In a broadcast system creating an ad-hoc radio, however, it would be more advantageous for electronic works to be continually broadcast based on the preferences of the recipient(s) or sender(s), but without the recipient(s) or sender(s) having to specifically choose each broadcast electronic work. Furthermore, it would be advantageous for a recipient of an electronic work to rate broadcast electronic works such that broadcast selections are dynamically adjusted based on ratings of recently broadcast electronic works.

Therefore, in view of the foregoing, it would be advantageous to provide a method, system, and program for prompting recipients of broadcast electronic works to rate the works and then use those ratings to dynamically adjust future broadcast work selections and to filter offers to purchase electronic works.

SUMMARY OF THE INVENTION

In view of the foregoing, one embodiment of the invention provides a rating response system for recipient rated wirelessly broadcast electronic works. Further, one embodiment of the invention provides a method, system and program for selecting electronic works to broadcast based on previous ratings by a recipient of wirelessly broadcast electronic works and offering purchase options to a recipient of a wirelessly broadcast electronic work rated affirmatively by the recipient.

According to one embodiment, a method for responding to recipient ratings of wirelessly broadcast electronic works is directed to receiving a wireless broadcast of an electronic work from a primary player at a secondary player. The method is directed to storing a sample of said electronic work at said secondary player. The method is directed, responsive to receiving a request for play of said stored sample of said electronic work, to controlling playback of said stored sample of said electronic work. The method is directed, responsive to said playback of said stored sample of said electronic work from said secondary player, to prompting a recipient of said electronic work to rate said electronic work. The method is directed, responsive to said recipient rating said electronic work with a favorable rating, to triggering a purchase offer for said electronic work when said secondary player is connected to a network enabling access to a purchase server.

According to another embodiment, a method for responding to recipient ratings of wirelessly broadcast electronic works is directed to receiving a wireless broadcast of an electronic work from a primary player at a secondary player. The method is directed to receiving a digital rights rule with said wireless broadcast of said electronic work, wherein said digital rights rule specifies what is a favorable rating. The method is directed, responsive to a playback of said electronic work from said secondary player, to prompting a recipient of said electronic work to rate said electronic work. The method is directed, responsive to said recipient rating said electronic work with the favorable rating, to triggering a purchase offer for said electronic work when said secondary player is connected to a network enabling access to a purchase server.

According to another embodiment, a method for responding to recipient ratings of wirelessly broadcast electronic works is directed to receiving a wireless broadcast of an electronic work from a primary player at a secondary player. The method is directed, responsive to a playback of said electronic work from said secondary player, to prompting a recipient of said electronic work to rate said electronic work. The method is directed, responsive to said recipient rating said electronic work with a favorable rating, to triggering a purchase offer for said electronic work when said secondary player is connected to a network enabling access to a purchase server. The method is directed, responsive to a recipient not entering said rating, to automatically assigning said rating based on preferences and previous ratings of said recipient.

According to another embodiment a system for responding to recipient ratings of wirelessly broadcast electronic works comprises a secondary player operative to receive a wireless broadcast of an electronic work from a primary player. The system comprises the secondary player operative to store a sample of said electronic work at said secondary player. The system comprises said secondary player, responsive to receiving a request for play of said stored sample of said electronic work, operative to control playback of said stored sample of said electronic work. The system comprises said secondary player, responsive to said playback of said stored sample of said electronic work from said secondary player, operative to require a recipient of said electronic work to rate said electronic work. The system comprises said secondary player, responsive to said recipient rating said electronic work with a favorable rating, operative to trigger a purchase offer for said electronic work when said secondary player is connected to a network enabling access to a purchase server.

According to another embodiment, a system for responding to recipient ratings of wirelessly broadcast electronic works comprises a secondary player operative to receive a wireless broadcast of an electronic work from a primary player. The system comprises said secondary player operative to receive a digital rights rule with said wireless broadcast of said electronic work, wherein said digital rights rule specifies what is said favorable rating. The system comprises said secondary player, responsive to a playback of said electronic work from said secondary player, operative to require a recipient of said electronic work to rate said electronic work. The system comprises said secondary player, responsive to said recipient rating said electronic work with a favorable rating, operative to trigger a purchase offer for said electronic work when said secondary player is connected to a network enabling access to a purchase server.

According to another embodiment, a system for responding to recipient ratings of wirelessly broadcast electronic works comprises a secondary player operative to receive a wireless broadcast of an electronic work from a primary player. The system comprises said secondary player, responsive to a playback of said electronic work from said secondary player, operative to require a recipient of said electronic work to rate said electronic work. The system comprises said secondary player, responsive to said recipient rating said electronic work with a favorable rating, operative to trigger a purchase offer for said electronic work when said secondary player is connected to a network enabling access to a purchase server. The system comprises said secondary player, responsive to a recipient not entering said rating, operative to automatically assign said rating based on preferences and previous ratings of said recipient.

According to another embodiment, a computer program product for responding to recipient ratings of wirelessly broadcast electronic works comprises a non-transitory computer readable storage media. The computer program product comprises first program instructions to receive a wireless broadcast of an electronic work from a primary player at a secondary player, second program instructions to store a sample of said electronic work at said secondary player, third program instructions to control playback of said stored sample of said electronic work, responsive to receiving a request for play of said stored sample of said electronic work, fourth program instructions to require a recipient of said electronic work to rate said electronic work, responsive to a playback of said electronic work from said secondary player, and fifth prom instructions to trigger a purchase offer for said electronic work when said secondary player is connected to a network enabling access to a purchase server, responsive to said recipient rating said electronic work with a favorable rating, wherein said first, second, third, fourth, and fifth program instructions are stored on said computer readable storage media.

According to another embodiment, a computer program product for responding to recipient ratings of wirelessly broadcast electronic works comprises a non-transitory computer readable storage media. The computer program product comprises first program instructions to receive a wireless broadcast of an electronic work from a primary player at a secondary player, second program instruction to receive a digital rights rule with said wireless broadcast of said electronic work, wherein said digital rights rule specifies what is a favorable rating, third program instructions to require a recipient of said electronic work to rate said electronic work, responsive to a playback of said electronic work from said secondary player, and fourth program instructions to trigger a purchase offer for said electronic work when said secondary player is connected to a network enabling access to a purchase server, responsive to said recipient rating said electronic work with said favorable rating, wherein the first, second, third, and fourth program instructions are stored on said computer readable storage media.

According to another embodiment, a computer program product for responding to recipient ratings of wirelessly broadcast electronic works comprises a non-transitory computer readable storage media. The computer program product comprises first program instructions to receive a wireless broadcast of an electronic work from a primary player at a secondary player, second program instructions to require a recipient of said electronic work to rate said electronic work, responsive to a playback of said electronic work from said secondary player, third program instructions to trigger a purchase offer for said electronic work when said secondary player is connected to a network enabling access to a purchase server, responsive to said recipient rating said electronic work with a favorable rating, and fourth program instructions, responsive to a recipient not entering said rating, to automatically assign said rating based on preferences and previous ratings of said recipient, wherein the first, second, third, and fourth prom instructions are stored on said computer readable storage media.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 7 is a block diagram depicting the components of an electronic work license server in accordance with the method, system, and program of the present invention;

FIGS. 8A-8E are illustrative representations of display choices presented to a user of a player enabled to receive, store, and broadcast electronic works in accordance with the method, system, and program of the present invention;

DETAILED DESCRIPTION OF THE PREFERRED EMBODIMENT

According to one aspect of the invention, a secondary player receives a wireless broadcast of an electronic work from a primary player. Electronic works may include, but are not limited to, a musical work, a textual work, a video work, and a film work.

Next, responsive to a playback of the electronic work from the secondary player, the secondary player requires a recipient of the electronic work to rate the electronic work. Playback of the electronic work may occur both synchronously with the broadcast of the electronic work and at a later time from a stored sample of the electronic work.

Responsive to the recipient rating the electronic work, the options available to the recipient are dynamically adjusted. First, responsive to the recipient rating the electronic work with a favorable rating, the secondary player triggers a purchase offer for the electronic work when the secondary player is connected to a network providing access to a purchase server. Second, responsive to the recipient rating the electronic work, the secondary player transfers the rating to the primary player, such that the primary player is enabled to dynamically adjust a next electronic work selection for broadcast based on the rating for the previously broadcast electronic work.

In addition to receiving the wireless broadcast of the electronic work from a primary player, the secondary player may receive digital rights rules. One digital rights rule may designate a purchase server link to automatically access if said recipient rating is favorable. Another digital rights rule may designate what is considered a favorable rating.

Figure 1:
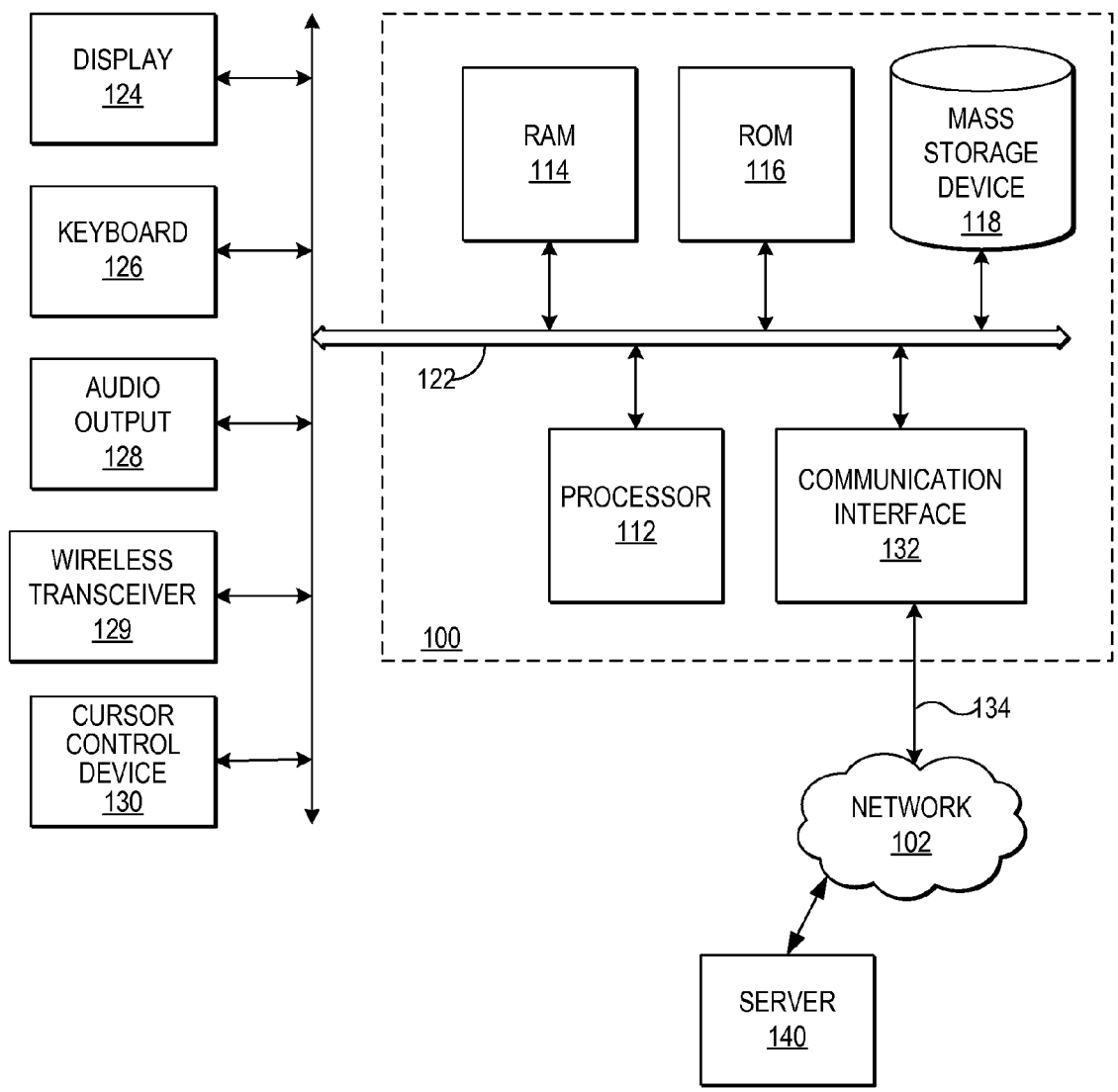
FIG. 1 is a block diagram depicting a computer system in which the present method, system, and program may be implemented.

Referring now to the drawings and in particular to FIG. 1, there is depicted one embodiment of a computer system in which the present method, system, and program may be implemented. The present invention may be executed in a variety of systems, including a variety of computing systems and electronic devices under a number of different operating systems. In general, the present invention is executed in a computer system that performs computing tasks such as manipulating data in storage that is accessible to the computer system. In addition, the computer system includes at least one output device and at least one input device.

Computer system 100 includes a bus 122 or other communication device for communicating information within computer system 100, and at least one processing device such as processor 112, coupled to bus 122 for processing information. Bus 122 preferably includes low-latency and higher latency paths that are connected by bridges and adapters and controlled within computer system 100 by multiple bus controllers. When implemented as a server system, computer system 100 typically includes multiple processors designed to improve network servicing power.

Processor 112 may be a general-purpose processor such as IBM's PowerPC™ processor that, during normal operation, processes data under the control of operating system and application software accessible from a dynamic storage device such as random access memory (RAM) 114 and a static storage device such as Read Only Memory (ROM) 116. The operating system preferably provides a graphical user interface (GUI) to the user. In a preferred embodiment, application software contains machine executable instructions that when executed on processor 112 carry out the operations depicted in the flowcharts of FIGS. 10, 11, 12, and others described herein. Alternatively, the steps of the present invention might be performed by specific hardware components that contain hardwired logic for performing the steps, or by any combination of programmed computer components and custom hardware components.

The present invention may be provided as a computer program product, included on a machine-readable medium having stored thereon the machine executable instructions used to program computer system 100 to perform a process according to the present invention. The term "machine-readable medium" as used herein includes any medium that participates in providing instructions to processor 112 or other components of computer system 100 for execution. Such a medium may take many forms including, but not limited to, non-volatile media, volatile media, and transmission media. Common forms of non-volatile media include, for example, a floppy disk, a flexible disk, a hard disk, magnetic tape or any other magnetic medium, a compact disc ROM (CD-ROM) or any other optical medium, punch cards or any other physical medium with patterns of holes, a programmable ROM (PROM), an erasable PROM (EPROM), electrically EPROM (EEPROM), a flash memory, any other memory chip or cartridge, or any other medium from which computer system 100 can read and which is suitable for storing instructions. In the present embodiment, an example of a non-volatile medium is mass storage device 118 which as depicted is an internal component of computer system 100, but will be understood to also be provided by an external device. Volatile media include dynamic memory such as RAM 114. Transmission media include coaxial cables, copper wire or fiber optics, including the wires that comprise bus 122. Transmission media can also take the form of acoustic or light waves, such as those generated during radio frequency or infrared data communications.

Moreover, the present invention may be downloaded as a computer program product, wherein the program instructions may be transferred from a remote computer such as a server 140 to requesting computer system 100 by way of data signals embodied in a carrier wave or other propagation medium via a network link 134 (e.g. a modem or network connection) to a communications interface 132 coupled to bus 122. Communications interface 132 provides a two-way data communications coupling to network link 134 that may be connected, for example, to a local area network (LAN), wide area network (WAN), or an Internet Service Provider (ISP) that provide access to network 102. In particular, network link 134 may provide wired and/or wireless network communications to one or more networks, such as network 102.

Network 102 may refer to the worldwide collection of networks and gateways that use a particular protocol, such as Transmission Control Protocol (TCP) and Internet Protocol (IP), to communicate with one another. Network 102 uses electrical, electromagnetic, or optical signals that carry digital data streams. The signals through the various networks and the signals on network link 134 and through communication interface 132, which carry the digital data to and from computer system 100, are exemplary forms of carrier waves transporting the information.

When implemented as a server system, computer system 100 typically includes multiple communication interfaces accessible via multiple peripheral component interconnect (PCI) bus bridges connected to an input/output controller. In this manner, computer system 100 allows connections to multiple network computers.

Further, multiple peripheral components may be added to computer system 100, connected to multiple controllers, adapters, and expansion slots coupled to one of the multiple levels of bus 122. When implemented as a portable player, for example, a wireless transceiver 129 may be connectively enabled on bus 122 for controlling wireless transmissions. Wireless transceiver 129 constantly listens to a pre-programmed public channel for new, remote parties and sends and receives data and messages on the public channel. Wireless transceiver 129 may be implemented by any short-range radio technology, such as, but not limited to, Bluetooth, 802.11, or Digital Enhanced Cordless Telecommunications (DECT). An audio output 128 is connectively enabled on bus 122 for controlling audio output through a speaker, headphones, or other audio projection device. A display 124 is also connectively enabled on bus 122 for providing visual, tactile or other graphical representation formats. A keyboard 126 and cursor control device 130, such as a mouse, trackball, or cursor direction keys, are connectively enabled on bus 122 as interfaces for user inputs to computer system 100. In alternate embodiments of the present invention, additional input and output peripheral components may be added.

Those of ordinary skill in the art will appreciate that the hardware depicted in FIG. 1 may vary. Furthermore, those of ordinary skill in the art will appreciate that the depicted example is not meant to imply architectural limitations with respect to the present invention.

The functionality of computer system 100 may be implemented in data processing systems from servers to portable players. Portable players may be computer systems that are tailored to efficiently receive, store and playback electronic works. Examples of portable players include, but are not limited to, MP3 players, portable DVD players, electronic book (ebook) play devices, and other devices specified for playback of a particular type of electronic work. Portable players may also be incorporated into other types of portable computer systems, such as wireless telephones and personal digital assistants.

Figure 2:
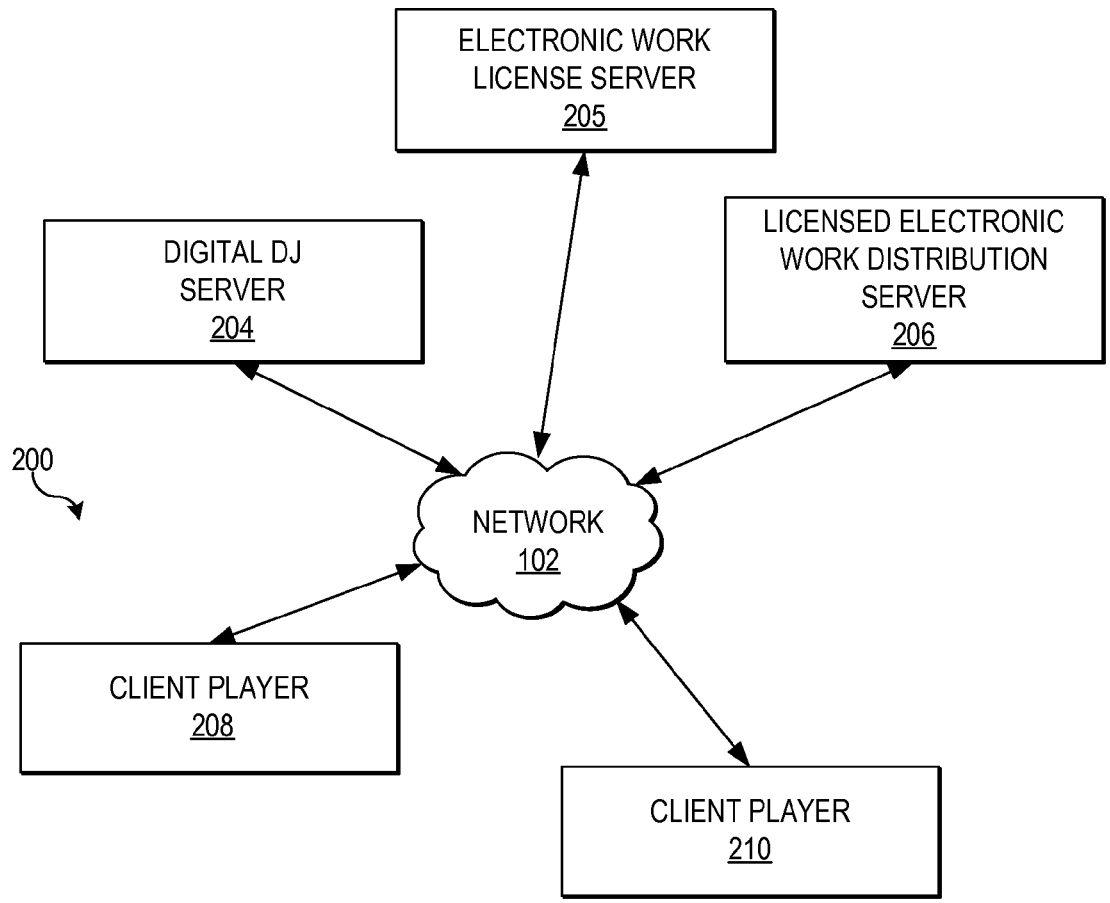
FIG. 2 is a block diagram depicting a distributed network system for facilitating an electronic work licensing and distribution system in accordance with the method, system, and program of the present invention.

With reference now to FIG. 2, a block diagram depicts a distributed network system for facilitating an electronic work licensing and distribution system in accordance with the method, system, and program of the present invention. Distributed system 200 is a network of computers in which the present invention may be implemented. Distributed system 200 contains a network 102, which is the medium used to provide communications links between various devices and computers connected together within distributed system 200. Network 102 may include permanent connections such as wire or fiber optics cables, temporary connections made through telephone connections, and wireless transmission connections.

The client/server environment of distributed system 200 includes multiple client players 208 and 210 communicatively connected to network 102. In addition, there are multiple servers, such as digital DJ server 204, electronic work license server 205, and licensed electronic work distribution server 206 communicatively connected to network 102.

The client/server environment of distributed system 200 is implemented within many network architectures. For example, the architecture of the World Wide Web (the Web) follows a traditional client/server model environment. The terms "client" and "server" are used to refer to a computer's general role as a requester of data (the client) or provider of data (the server). In the Web environment, web browsers such as Netscape Navigator™ typically reside on client players 208 and 210 and render Web documents (pages) served by a web server, such as servers 204, 205, and 206. Additionally, each of client players 208 and 210 and servers 204, 205, and 206 may function as both a "client" and a "server" and may be implemented utilizing a computer system such as computer system 100 of FIG. 1. Further, the present invention is also implemented by client players 208 and 210 engaged in peer-to-peer network communications and downloading via network 102.

The Web may refer to the total set of interlinked hypertext documents residing on servers all around the world. Network 102, such as the Internet, provides an infrastructure for transmitting these hypertext documents between systems connected to network 102. Documents (pages) on the Web may be written in multiple languages, such as Hypertext Markup Language (HTML) or Extensible Markup Language (XML), and identified by Uniform Resource Locators (URLs) that specify the particular web page server from among servers, such as server 205, and pathname by which a file can be accessed, and then transmitted from the particular web page server to an end user utilizing a protocol such as Hypertext Transfer Protocol (HTTP) or file-transfer protocol (FTP). Web pages may further include text, graphic images, movie files, electronic books, sound files, and streaming audio, as well as Java applets and other small embedded software programs that execute when the user activates them by clicking on a link.

While network 102 is described with reference to the Internet, network 102 may also operate within an intranet or other available networks, including peer to peer networks. Furthermore, client players 208 and 210 may connect to network 102 through a data processing system acting as a port for transferring information between servers accessible through network 102 and client players 208 and 210. Additionally, client players 208 and 210 may communicate within a local wireless network. This local wireless network is typically considered "ad-hoc" because it is created when client players 208 and 210 are within wireless broadcast range of one another.

Client players 208 and 210 are preferably computer systems enabled to receive, play, and store electronic works. As described, client players 208 and 210 are portable and enabled to receive and send wireless transmissions within a wireless network range. In an alternate embodiment, any of client players 208 and 210 may be considered stationary.

Multiple ranges of wireless transmission capability may be implemented within a single client player. For example, Bluetooth, which is a short range wireless technology and 802.11, which is a mid-range wireless technology, may be implemented within a single client player to enable multiple ranges of wireless transmissions. In particular, the DRM rules attached to an electronic work may specify the preferred reception and transmission ranges for broadcast of an electronic work and the DRM rules may limit the type of network available for broadcast of an electronic work. For example, DRM rules may specify that electronic works are transmittable by cable only, by Bluetooth only, or by a peer to peer network allowing a set number of concurrent connections. It is important to note that while the present invention is described with emphasis upon wirelessly broadcast electronic works, electronic works may also be broadcast via a cabled network connection from client player 208 and client player 210.

Digital DJ server 204 provides a service for selecting electronic works for play between client players 208 and 210. Digital DJ server 204 may track the previous ratings of electronic works made by users of client players 208 and 210. Then, digital DJ server 204 may determine which electronic work to play next from the electronic works that currently reside on client player 208 or 210. Alternatively, digital DJ server 204 may determine which electronic work to play next from electronic works currently residing at digital DJ server 204. The functionality of digital DJ server 204 may also reside within client players 208 and 210.

Electronic work license server 205 provides a service for tracking licenses and use of licensed electronic works. Additionally, electronic work license server 205 may provide licenses to client players 208 and 210 or adjust the licenses to the electronic works already acquired.

Licenses are preferably attached to electronic works in the form of DRM rules. These DRM rules may allow a user who has purchased an electronic work to wirelessly transmit a sample of that electronic work to other electronic devices. For example, a song purchased by the user of client player 208 may include DRM rules that allow for broadcast of the song to client player 210. Additionally, DRM rules preferably limit the allowed usage of a sample electronic work and are thus transmitted with the broadcast of electronic work. Where, however, DRM rules or other licensing rules are not attached to an electronic work received at client player 208 or 210, then the client player may initiate a request for licensing the electronic work with electronic work license server 205 before the electronic work can be played back.

Licensed electronic work distribution server 206 provides a service for selling electronic works with licenses in the form of attached DRM rules. A user may be required to register an identity or make a payment to acquire an electronic work. Where a user samples an incomplete version of an electronic work from a wireless broadcast, the DRM rules may include a link to licensed electronic work distribution server 206 to acquire a complete version of the electronic work.

Figure 3:
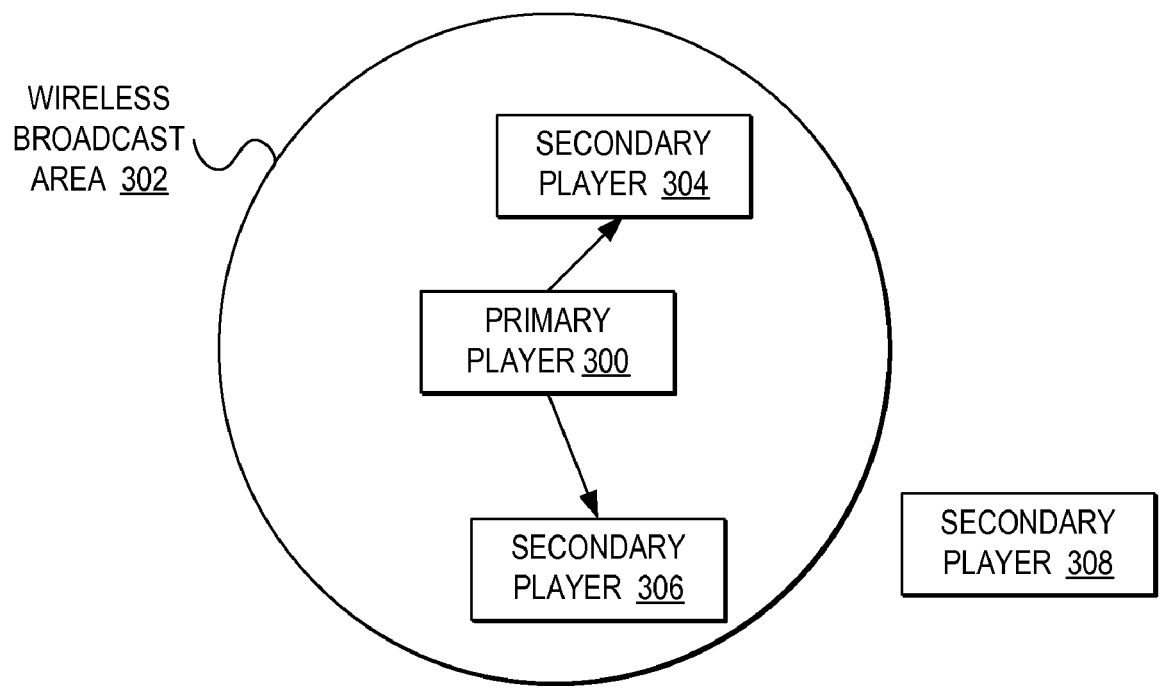
FIG. 3 is a block diagram depicting a wireless network broadcast in accordance with the method, system, and program of the present invention.

Referring now to FIG. 3, there is depicted a block diagram of a wireless network broadcast in accordance with the method, system, and program of the present invention. As illustrated, of the client players illustrated in FIG. 2, one of these players may be designated as a primary player, such as primary player 300 for the local wireless network. Players may vie for the designation as primary player by offering electronic works or one player may automatically be designated as primary player. Further, after one player receives a wireless broadcast of an electronic work, the player may move to a new broadcast area and become the primary player for that electronic work in the new broadcast area. It is important to note that while a wireless network of players is described, in an alternate embodiment, players may also be connected via a cable or a wired network connection.

In one example, primary player 300 searches for secondary players enabled to wirelessly communicate. Primary player 300 is enabled to wirelessly communicate within a range designated by wireless broadcast area 302. Once primary player 300 detects other players, such as secondary players 304 and 306, within wireless broadcast area 302, then primary player 300 establishes a local wireless network. Within the local wireless network, primary player 300 may wirelessly stream the electronic work being played on primary player 300 as a sample electronic work. Preferably, the DRM rules and context associated with the streamed electronic work are also broadcast. An advantage to streaming the electronic work as it is playing on primary player 300 is that synchronous play is possible on secondary players 304 and 306. However, in addition to streaming an electronic work as it plays, the entire sample electronic work may be wirelessly transmitted as a data file from primary player 300 to secondary players 304 and 306.

In an alternate example, primary player 300 is constantly broadcasting a stream within wireless broadcast area 302 of the current electronic work playing on primary player 300. When players, such as secondary players 304 and 306, are within the wireless network area, then the broadcast stream is received at the secondary players. For example, primary player 300 may be a stationary player that wirelessly broadcasts within a store or other defined area to secondary players that enter the store or other defined area. In another example, primary player 300 may be a portable player that wirelessly broadcasts from its current location, thus creating an ad-hoc local wireless network area as it moves.

The broadcast of an electronic work by primary player 300 may be controlled by the DRM rules attached to the electronic work being broadcast. In particular, the DRM rules may specify preferences or limitations for the reception and transmission ranges and the transmission mediums. Preferably, wireless and cabled feedback systems are included in primary player 300 and secondary players 304 and 306 to facilitate range detection.

The context of an electronic work broadcast by primary player 300 may also be transmitted with the electronic work. The context of the electronic work generally includes the history, reviews, and distribution path of an electronic work. For example, for a musical work, the context may include, but is not limited to, a song title, artist name(s), genre, album name, album type, distributor name, distributor link, label name, label link, artist link, reviewer name, reviewer ratings, and reviewer text.

Secondary players 304 and 306 receive the streamed music and may synchronously playback the music stream. Additionally or alternatively, secondary players 304 and 306 may store a copy of the broadcast stream with the DRM rules for later playback. Once secondary players 304 and 306 move out of broadcast area 302, such as the position of secondary player 308, then only the stored copy of the broadcast stream can be played back as allowed by the DRM rules.

Prior to broadcasting an electronic work, primary player 300 may query secondary players 304 and 306 for user preferences. Primary player 300 may then determine which electronic works stored on primary player 300 should next be played based on the user preferences from secondary players 304 and 306 and the user preferences for primary player 300. Alternatively, primary player 300 may transmit all the relevant user preferences to a digital DJ via an Internet connection and request recommendations for the next broadcast from the current electronic works accessible from primary player 300 or any of the secondary players. Further, the digital DJ may recommend new electronic work and negotiate payment for the work with a licensed electronic work distribution server.

Once a user listens to or views a streamed electronic work at secondary player 304 or 306, the user preferably rates the electronic work. A rating may take multiple forms including, but not limited to, a thumbs up/down, a numeral rating, an alphanumeric rating, or other selection from a rating system implemented by the players. Additionally, a user may review the electronic work. Review comments and the identity of the reviewer may be added to the context of the electronic work and transmitted among the other players and broadcast with the electronic work.

Users are also preferably prompted to purchase licenses for wirelessly broadcast works. If the DRM rules include requirements for filtering purchase offers to users based on the user rating of the electronic work, then the user rating of an electronic work is first compared with the DRM rules. For example, a DRM rule may specify that a user is to be prompted to purchase the license for a work stored at the secondary player only if the user rates the work with a thumbs up. Since it is preferable to prompt a user to purchase a license electronically, the actual prompting to the user may be delayed until the secondary player detects a network connection through which an electronic work license server or licensed electronic work distribution server are accessible for purchase of the license. A license may include additional DRM rules or other rights and restrictions to an electronic work. Licenses may provide full use, one time use, or partial use, for example.

If the secondary player, such as secondary player 304, is still within broadcast range of primary player 300 when the user rates the streamed electronic work, then secondary player 304 preferably transmits the rating of the broadcast electronic work to primary player 300. Primary player 300 may then use the rating to dynamically adjust the next selected electronic work for broadcast.

Additionally, when a player, such as any of primary player 300 or secondary players 304 and 306, establishes a network connection to the Internet or other network with servers that monitor licenses, the player may automatically report a record of any sample electronic work received at the player to an electronic work license server or other server system that monitors distribution of licenses. Further, when a player detects a network connection to the Internet or other network with servers that monitor electronic work ratings, the player may automatically report a record of the ratings assigned by users to sample electronic works received at the player to the digital DJ or other server system that monitors ratings and comments about licensed electronic works.

Figure 4:
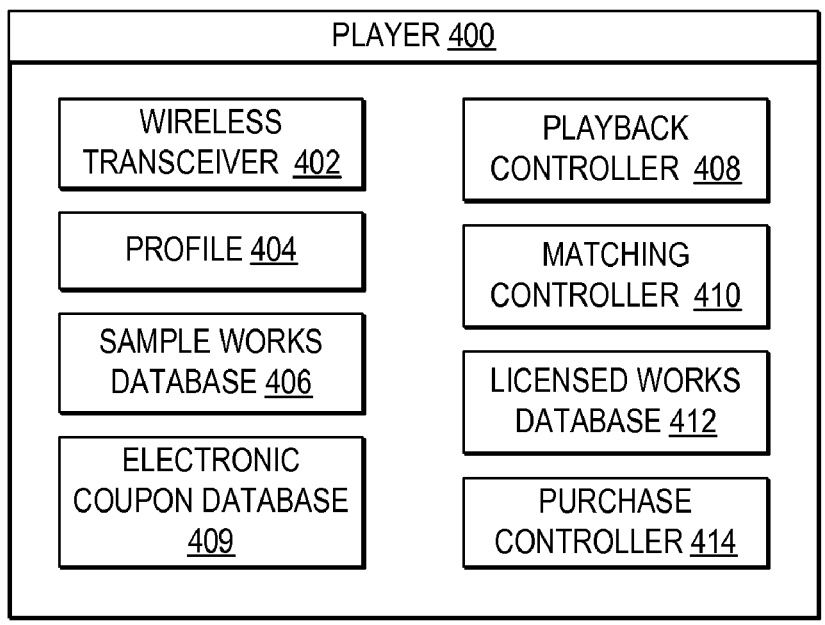
FIG. 4 is a block diagram depicting a music player in accordance with the method, system, and program of the present invention.

With reference now to FIG. 4, there is illustrated a block diagram of a music player in accordance with the method, system, and program of the present invention. As illustrated, player 400 includes an example of components that may operate within an electronic device enabled to receive, play, and store electronic works.

First, player 400 includes a wireless transceiver 402 enabled to send and receive wireless communications. Wireless transceiver 402 may implement multiple types of wireless broadcast technology including, but not limited to, Bluetooth, 802.11, and DECT.

Next, player 400 includes a playback controller 408 enabled to synchronize playback of a data stream with the other players playing the same data stream of an electronic work. As long as player 400 is within the broadcast range of the primary player, playback controller 408 may enable playback of a current data stream of an electronic work or playback of a previously stored sample electronic work received from the primary player.

Playback controller 408 also preferably condenses and stores data streams of electronic works in a sample works database 406. Sample works database 406 includes condensed files, in formats such as MP3, from streaming electronic works with DRM rules. When player 400 is outside the broadcast range of the primary player, then the stored sample electronic works in sample works database 406 may be played back, but only according to DRM rules for each electronic work. Further, playback controller 408 may prohibit playback of any sample electronic work acquired without any licensing rights.

Playback controller 408 also controls playback of electronic works downloaded onto player 400 with a license for personal use and potentially also for broadcast to other players. In particular, electronic works may be downloaded that include a license to transfer the electronic work file or broadcast the electronic work to other players as a sample electronic work with DRM rules limiting playback of the sample work.

When electronic works are streamed from one player to another, electronic coupons may also be broadcast. Electronic coupons received at player 400 are stored in electronic coupon database 409. Electronic coupons may include discounts, rebates, and other incentives for a recipient of a broadcast electronic work to purchase the electronic work or purchase additional licensing rights to the electronic work from an electronic work license server or a licensed electronic work distribution server.

A profile 404 stored on player 400 preferably records the electronic work preferences for a user. Profile 404 may include, but is not limited to, a listing of the current electronic works stored on player 400 and ratings assigned by the user to each of the electronic works stored on player 400. Additionally, profile 404 may include, but is not limited to, a listing of electronic works previously listened to or viewed by the user and the rating assigned by the user to each. Further, profile 404 may include, but is not limited to, a listing of styles of music, film, books, musicians, actors, years of recording, and other categories of preferences for a user. Moreover, profile 404 may include, but is not limited to, a listing of types of music, film, artists, actors, songs, and years of recording that a user would like to listen to or view in the future.

Player 400 can transfer the data in profile 404 to other players within a local wireless network. Further, player 400 may receive profiles from other players within a local wireless network. A matching controller 410 within player 400 compares the profiles of other users within the local wireless network with the context of the electronic works available for broadcast in licensed works database 412 and selects music for broadcast to the other players that best satisfies the preferences of all the listeners. If the preferences of some users cannot be matched with the preferences of other users, then matching controller 410 may alternate selections between those that will satisfy the preferences of a first group of users and then those that will satisfy the preferences of a second group of users. Alternatively, if a preference match cannot be made to the current electronic works, then player 400 may seek to acquire new electronic works that will match preferences.

As an additional advantage, once other users listen to or view an electronic work broadcast from player 400, ratings by the recipient users may be transmitted back to player 400. Matching controller 410 may then dynamically adjust the next electronic work to be broadcast from player 400 based on the reported rating for the recently broadcast electronic work.

Further, when a wirelessly broadcast work is received at player 400, a user is prompted to rate the electronic work. The rating is then stored in profile 404 and transmitted to the player from which the electronic work was received. Thus, user preferences dynamically change for each electronic work viewed or listened to by a user.

A purchase controller 414 preferably initiates access via an Internet or other network connection to an electronic work license server or a licensed electronic work distribution server to acquire additional licensing and to register stored samples of electronic works from broadcasts. A particular electronic work license server or licensed electronic work distribution server may be specified for purchases in the DRM rules transferred with an electronic work.

In particular, for each rating entered by a user in response to listening or viewing a work at player 400, purchase controller 414 determines if there is a DRM rule for the electronic work specifying when a user should be prompted to purchase an electronic work. If there is a rule requiring prompting upon detection of a network connection, then purchase controller 414 triggers the prompting upon detection of a network connection to an electronic work license server or a licensed electronic work distribution server. For example, a DRM rule may specify that a user should be prompted to purchase an electronic work only if the user rates the work with a thumbs up. In this way, a distributor can distribute a work, but only prompt purchases from those who have received the work and given a favorable rating. Further, the DRM rule may require that those who give a sample work a favorable rating be required to purchase additional licensing rights to the work for further playback.

Figure 5:
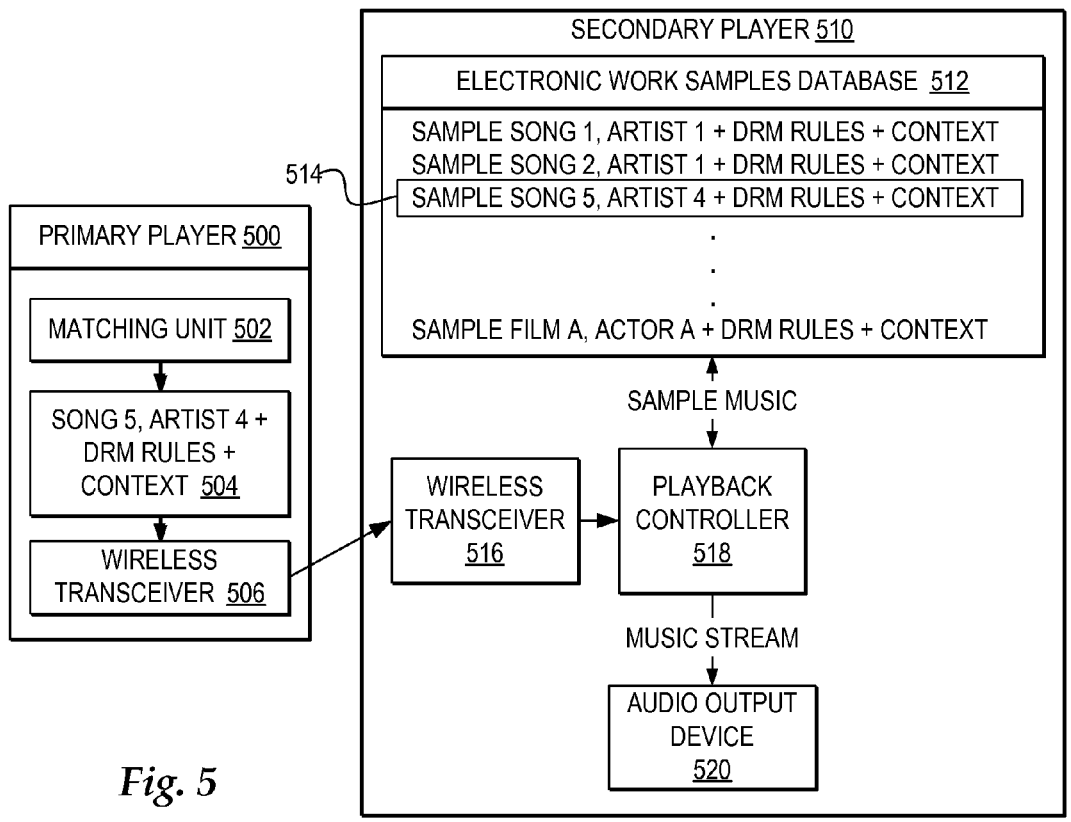
FIG. 5 is a block diagram depicting the wireless communication between a primary player broadcasting music and the secondary player receiving music in accordance with the method, system, and program of the present invention.

Referring now to FIG. 5, there is depicted a block diagram of the wireless communication between a primary player broadcasting music and the secondary player receiving music in accordance with the method, system, and program of the present invention. As illustrated, a primary player 500 includes a matching unit 502 that selects song 5 from artist 4 with DRM rules and context, as depicted at reference numeral 504. When matching unit 502 selects an electronic work, the context data for an electronic work and DRM rules are matched with a selection of user preferences from the user of the primary player and the users of any accessible secondary players. Context data for an electronic work may include, but is not limited to, song title, artist name(s), genre, album name, album types (e.g. original LP or compilation), reviewer name, reviewer ratings and reviewer comments. DRM rules may include, for example, whether the electronic work is free or is ruled by a limited license.

In this embodiment, the musical work is streamed through wireless transceiver 506 and received at wireless transceiver 516 of secondary player 510. Secondary player 510 includes a playback controller 518 that synchronizes playback of the music stream with primary player 500 and controls output of the stream through audio output device 520. The music stream is also stored as sample music by music playback controller 518 in an electronic work samples database 512. As illustrated at reference numeral 514, the sample of song 5, artist 4 with DRM rules and context is stored in music samples database 512. While the present invention is described where DRM rules and context are transmitted in a wireless broadcast of a work, in an alternate embodiment, only the electronic work may be transmitted in a wireless broadcast of a work.

Figure 6:
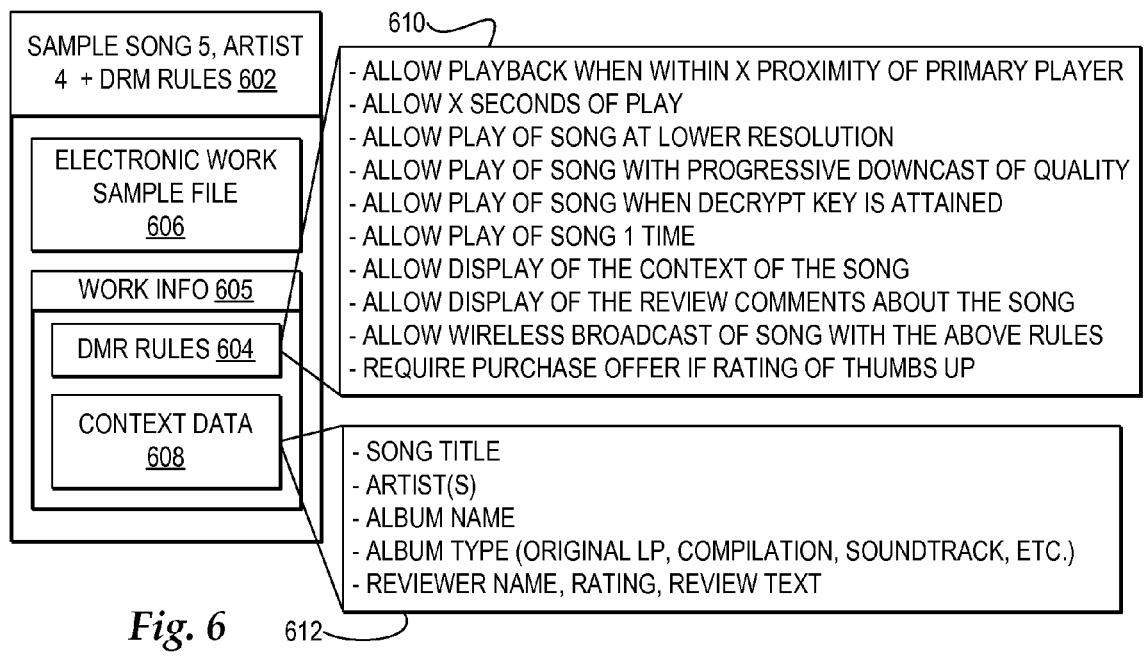
FIG. 6 is a block diagram depicting a sample song stored in a music player in accordance with the method, system, and program of the present invention.

With reference now to FIG. 6, there is depicted a block diagram of a sample musical work stored in a secondary player in accordance with the method, system, and program of the present invention. As illustrated, the storage of an electronic work, here song 5 from artist 4, may include work info 605 and a music stream file 606.

Work info 605 includes DRM rules 604 and context data 608. DRM rules 604 preferably control play of the electronic work and output of the context of the electronic work. Context data 608 preferably includes historical context, distribution context, and review context for the electronic work.

In the examples of DRM rules 604, playback of a song stored at a music player may be allowed when the player is within a certain transmission range of the primary player. Proximity to the primary player may be measured by the signal strength detected from the primary player.

In another example of DRM rules 604, the song stored at a player may be played back, but only a certain number of seconds of the song or a lower resolution or downcast in quality may be allowed. Further, in another example, the entire song may be stored, but the digital rules may require a decrypt key be accessed from a licensing database before the song can be played. In particular, rather than storing the music stream, the music file may be transferred and stored where the decrypt key is required for later play. Further, DRM rules 604 may allow playback of the entire song In addition to playback of the song, DRM rules 604 may restrict what portions of context data 608 can be viewed where the context includes, but is not limited to, song title, album title, composer, writer, singer, producer, label, year of recording, genre, album type (e.g. original LP or compilation), reviewer name, reviewer ratings, and reviewer text. Additionally, DRM rules 604 may restrict what review comments the user can view about the song. Review comments may be included in the streamed transmission from multiple music reviewers or from other users who have rated the song. DRM rules 604 may require that a review play prior to, during, or after the electronic work. Advantageously, each user receiving an electronic work may update context data 608 with ratings and review comments. Further, when a user specifies ratings and review comments to update context data 608, the user may further specify DRM rules for play or display of the rating and review comments.

Additionally, DRM rules 604 may restrict whether a song may be wirelessly broadcast to other players. In the example, wireless broadcast is allowed with the restrictions established by the other DRM rules. In alternate embodiments, the DRM rules associated with a sample broadcast may vary from the DRM rules associated with a licensed copy of a work.

Context data 608 also preferably identifies the manufacturer, producer, and distributor and provides contact information for making purchases. Additionally, the music playback controller preferably adds an identifier for each recipient who receives a broadcast of an electronic work to context data 608, such that the distribution flow of an electronic work is tracked.

Preferably, a music playback controller within a music player restricts play of music or other electronic works and display of context data on the player according to the DRM rules. Alternatively, a music playback controller in a music player may require acquisition of DRM rules for sample music from a licensing server prior to playing the electronic work. Further, where music and other electronic works are received without DRM rules, the music playback controller may automatically initiate requests for ratings, offers to purchase, and other promptings that might otherwise be filtered by DRM rules.

With reference now to FIG. 7, there is illustrated a block diagram of the components of an electronic work license server in accordance with the method, system, and program of the present invention. As illustrated, an electronic work license server 700 includes a license controller 702. License controller 702 receives requests to acquire licenses for music. Further, license controller 702 may receive requests to verify a music license from players receiving broadcast electronic works. Preferably, a license database 704 stores licenses for electronic works and a license registry database 706 stores user identifiers for those who acquire music licenses. In particular, if the user meets the requirements of the license, such as paying a fee or registering, then a license for the electronic work may be transferred. In an alternate embodiment, electronic work license server 700 controls licenses for all types of electronic works.

As illustrated at reference numeral 708, multiple types of licenses may be implemented with restrictions on use. The actual restrictions are preferably defined by DRM rules. When a user purchases or registers an electronic work, the user may be provided with a list of available types of licenses, such as the types listed at reference numeral 708. Different costs may be associated with different types of licenses. Furthermore, it will be understood that in addition to the example types of licenses available, other types of licensing agreements may be available and licensing agreements may be tailored for a particular user.

Referring now to FIGS. 8A-8E, there are depicted illustrative representations of display choices presented to a user of a player enabled to receive, store, and broadcast electronic works in accordance with the method, system, and program of the present invention. As illustrated in FIG. 8A, responsive to a player detecting a query from a primary player for music preferences, the user is prompted to authorize transmitting preferences to the primary player. In particular, in this request, the user is prompted to authorize transmission of music preferences. In alternate embodiments, the user may be required to also authorize transmission of an identity and other information beyond the user's music preferences before access to a broadcast electronic work is allowed.

As depicted in FIG. 8B, the user also receives prompts to select whether to listen to or view a particular electronic work broadcast by another player. In particular, the user is prompted to select whether to listen to a particular song. In alternate embodiments, the user may be prompted to select whether to listen to electronic works of a particular type, from a particular artist, from a particular label, and from other specifiable categories.

As illustrated in FIG. 8C, the user is prompted to select whether to store a sample of the electronic work received from a primary player. If the user chooses to store a sample of the electronic work, then the broadcast electronic work is stored in a default or specified format with DRM rules if available. The user may also choose to store only a portion of the sample of the electronic work or may set a preference to automatically store any broadcast electronic works received at the player.

As illustrated in FIG. 8D, the user is prompted to rate the electronic work. The user may also be prompted to rate overall the selection of works received from a particular primary player. Further, the user may be prompted to rate particular characteristics of a work and to write comments about a particular work or group of works. The prompting may be displayed while a user is listening to a synchronous playback of a current broadcast or when the user is listening to playback of a stored sample from a broadcast. The rating scale presented to the user may be specified by the DRM rules, specified by the user, or arbitrarily selected.

In an alternate embodiment, if a user does not rate the electronic work, then a rating may be automatically selected based on the user's preferences. For example, if the user is prompted to rate a musical work from a particular artist and that user has previously given a thumbs up to all other works received from that artist, then a selection may be automatically made if the user does not rate the electronic work. Further, in a system where a user is not prompted to rate the electronic work, the player may infer a rating and present the inferred rating to the recipient for confirmation.

As depicted in FIG. 8E, the user is prompted to select whether to receive purchase options for the electronic work received from a wireless broadcast. In particular, when a secondary player receives a wireless broadcast of an electronic work, the purchasing information for that electronic work is preferably transferred to and stored at the secondary player. A user may be automatically prompted to select whether to initiate a purchase of a licensed copy of a broadcast electronic work as depicted. Alternatively, a user may be prompted to only select whether to initiate a purchase of those broadcast electronic works which the user rates favorably.

Figure 9:
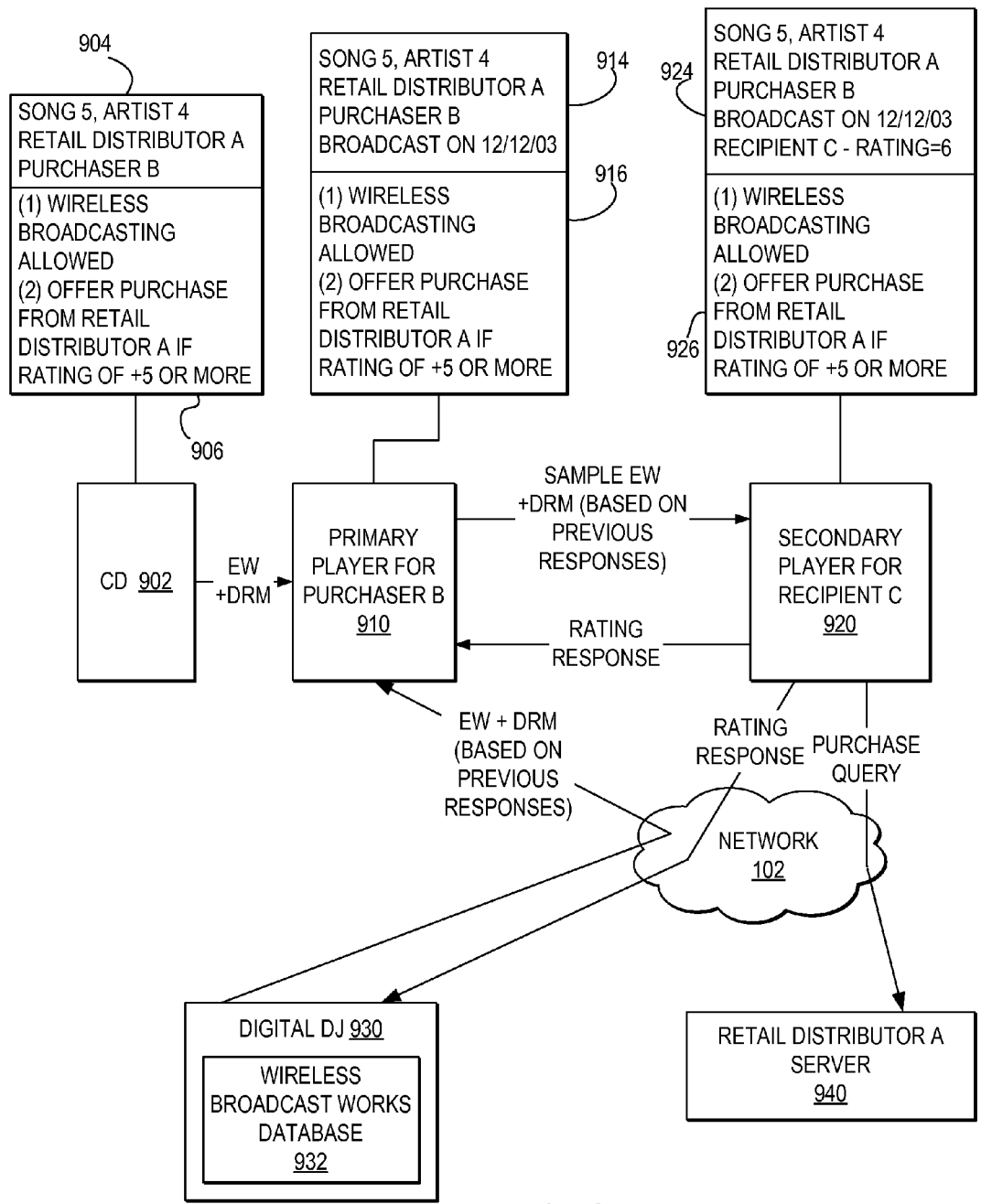
FIG. 9 is a block diagram of an example of a rating system for wirelessly broadcast electronic works in accordance with the method, system, and program for the present invention.

Referring now to FIG. 9, there is depicted a block diagram of an example of a rating system for wirelessly broadcast electronic works in accordance with the method, system, and program for the present invention. As illustrated, "purchaser B" purchases a CD 902. CD 902 includes multiple musical electronic works (EWs) separated into tracks. Further, CD 902 includes DRM rules that include DRM rules 906 and context 904.

In this particular example, purchaser B uploads song 5 from artist 4 of CD 902 to primary player 910. Although not depicted, the upload may be facilitated by another computer system that converts the musical track into a format playable by primary player 910. In particular, when an intermediary computer system converts the musical track into a playable format for upload to primary player 910, the intermediary computer system may be required to register the purchased work.

Context data 904 may be initially set by the manufacturer or distributor of an electronic work. In the example, the distributor for the electronic work is designated. In alternate examples, the distributor, label, and other parties involved in the distribution process may be designated. As the electronic work is transferred from one player to another, each recipient player preferably updates context data 904 with an identifier for each recipient. For example, context data 914 includes the previous distribution information plus the purchaser identity and date of wireless broadcast from primary player 910. Additionally, as the electronic work is transferred from one player to another, the rating response of each recipient is preferably added to the context data. For example, context data 924 includes the rating by recipient C of a 6.

Preferably, transfer of DRM rules 906 is required with any file transfer or broadcast of an electronic work. In the example, DRM rules 906 allow for a wireless broadcast of the musical work and require an offer to purchase the musical work from retail distributor D if a rating of 5 or more is given to the musical work by one receiving the wireless broadcast of the musical work. Thus, any player receiving the musical work with DRM rules 906 is allowed to broadcast the electronic work. Further, according to these rules, an offer to purchase the musical work is only made to the recipient if the recipient rates the musical work favorably. In alternate embodiments, DRM rules 906 may place other requirements on the play, broadcast, purchase, and distribution of an electronic work.

Primary player 910 advantageously wirelessly broadcasts the electronic work as a sample with DRM rules to a secondary player 920. Secondary player 920 receives the wirelessly broadcast work and may synchronously play back and store the sample work with DRM rules. Secondary player 920 may update the distribution information with the recipient information, as illustrated in context data 924. For each rating that updates context data 920, the secondary player may also update the DRM rules to restrict the future use of that rating when it is broadcast with the electronic work to another player.

When an electronic work is received at secondary player 920 and played, the recipient is preferably prompted to rate the electronic work. The recipient rating may be used in multiple ways.

First, secondary player 920 may transfer the recipient rating back to primary player 910. Primary player 910 then dynamically selects the next electronic work for wireless broadcast based on the recipient rating of a recently played electronic work. For example, after recipient C at secondary player 920 listens to song 5 from artist 4, recipient C gives the musical work a favorable rating of 6. Primary player 910 has a playlist of musical works already selected based on the current preferences of recipients of broadcast electronic works. However, upon receiving the rating from recipient C about the previously played musical work, primary player 910 may adjust the playlist to account for a favorable or unfavorable rating of the recently played electronic work.

Second, secondary player 920 may transfer the recipient rating to a digital DJ 930. Digital DJ 930 receives the rating and dynamically selects the next electronic work to transmit to primary player 910 for broadcast based on the recipient rating. Digital DJ 930 may receive ratings from secondary player 920 when outside the broadcast range of primary player 910, such that recipient ratings of electronic works may be transmitted to digital DJ 930 when secondary player 920 is enabled to access network 102.

Third, secondary player 920 may compare the recipient rating with any DRM rules relating to ratings. For example, a recipient rating for song 5, artist 4 is compared with the DRM rule requiring an offer to purchase the musical work if the recipient rates the work at a "5" or more. In this example, if the recipient rates the musical work at a "6", then a trigger is set to present an offer to the recipient to initiate a query for the work. When secondary player 920 is enabled to access network 102, then an offer is presented to the recipient to initiate a purchase query for the favorably rated electronic work. The recipient may then select to initiate a purchase query to purchase a license or the entire electronic work from a distributor. If the recipient selects to initiate a purchase query, a request is sent to the distributor designated in the DRM rules. In this example, the purchase query is sent to retail distributor A server 940.

If the recipient is prompted to rate the electronic work and does not do so after a period of time or if rating the electronic work is optional and not done, then a rating may be automatically assigned based on the recipient's preferences and previous ratings. Thus, before secondary player 920 may compare the recipient rating with any DRM rules relating to ratings, a rating may be automatically assigned. Alternatively, the DRM rules may specify a particular response when a recipient does not rate an electronic work.

Figure 10:
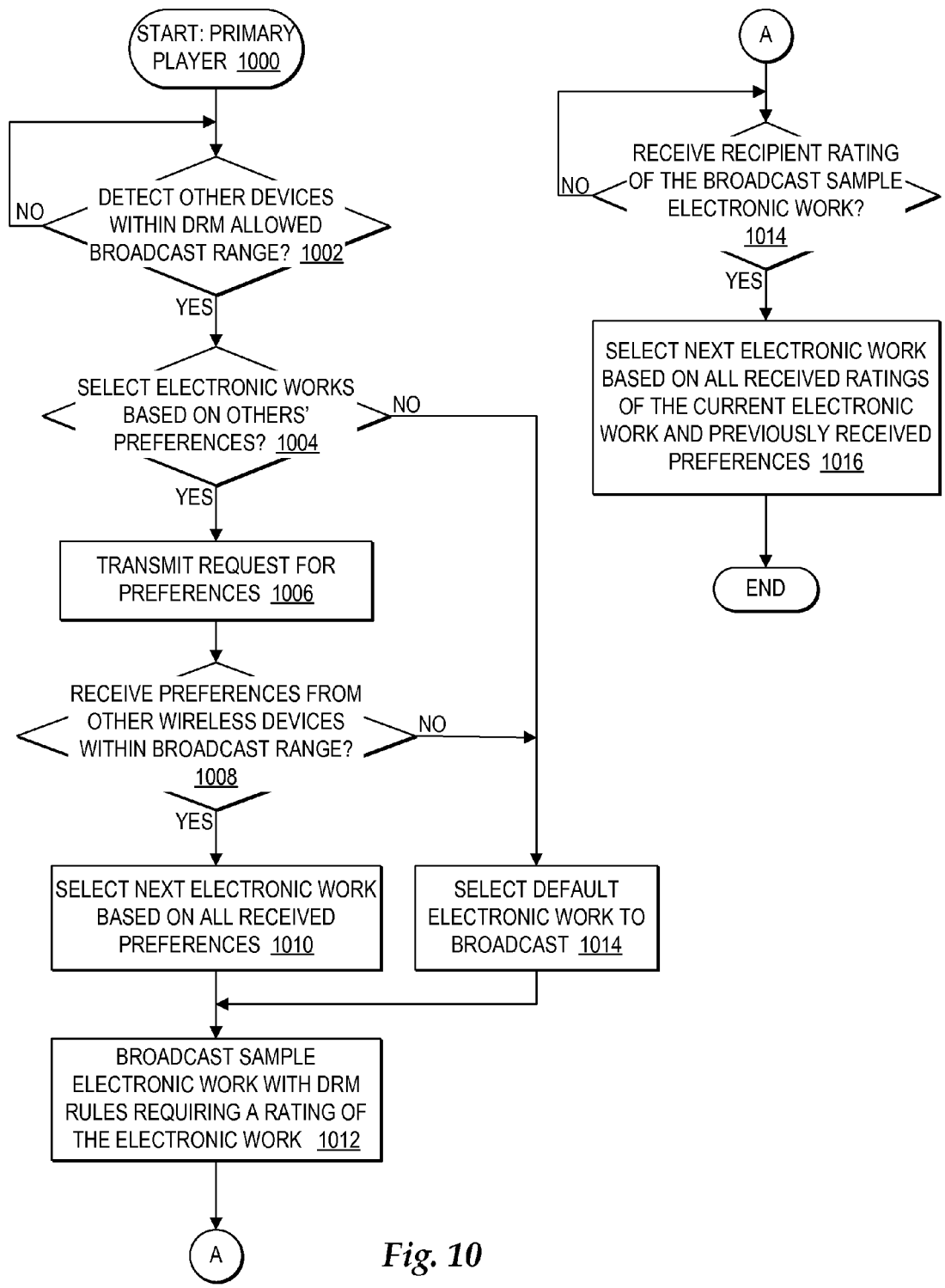
FIG. 10 is a high level logic flowchart of a process and program for controlling a primary player.

Referring now to FIG. 10, there is depicted a high level logic flowchart of a process and program for controlling a primary player. As illustrated, the process starts at block 1000 and thereafter proceeds to block 1002. Block 1002 depicts a determination whether other devices within the DRM allowed broadcast range are detected. In particular, a DRM rule for broadcast of a particular electronic work preferably specifies the connection types, broadcast ranges, and other broadcast limitations and preferences. If other devices are not detected, then the process iterates at block 1002. If other devices are detected, then the process passes to block 1004.

Block 1004 depicts a determination whether the setting to select electronic works based on others' preferences is selected. The DRM rules may require a selection of electronic works based on preferences. Alternatively, a user at a primary player may require a selection of electronic works based on preferences. If the selection based on preferences is not required, then the process passes to block 1014. Block 1014 depicts selecting a default electronic work to broadcast. Alternatively, at block 1004, if the selection based on preferences is required, then the process passes to block 1006. Block 1006 illustrates transmitting a request for preferences to the other wireless devices and the process passes to block 1008. In particular, the request for preferences may specify which categories of preferences are requested based on DRM rules or a user specification. For example, the request for preferences may specify the category of musician preferences and musical style preferences.

Block 1008 depicts a determination whether preferences from other wireless devices within broadcast range are received. If no preferences are received, then the process passes to block 1014. If preferences are received, then the process passes to block 1010. Block 1010 depicts selecting the next electronic work to broadcast based on all the received preferences. In particular, the process may also require that the electronic work include DRM rules that allow for wireless broadcasting. Further, the primary player may offload the electronic work selection process to a digital DJ located in another electronic device accessible via a network. Moreover, the playback controller may further filter the sets of preferences received to only select the next electronic work for broadcast based on a selection of the preferences received from secondary players. Next, block 1012 depicts broadcasting the sample electronic work with DRM rules requiring a recipient to rate the sample electronic work, and the process passes to block 1014.

Block 1014 depicts a determination whether a recipient rating of the broadcast sample electronic work is received. If a recipient rating is not received, the process iterates at block 1014. When a recipient rating is received, then the process passes to block 1016. Block 1016 illustrates selecting the next electronic work based on all the received ratings of the current electronic work and the previously received preferences. In particular, both past static preferences and current dynamic ratings are then used to select the next electronic work for play, and the process ends.

Figure 11:
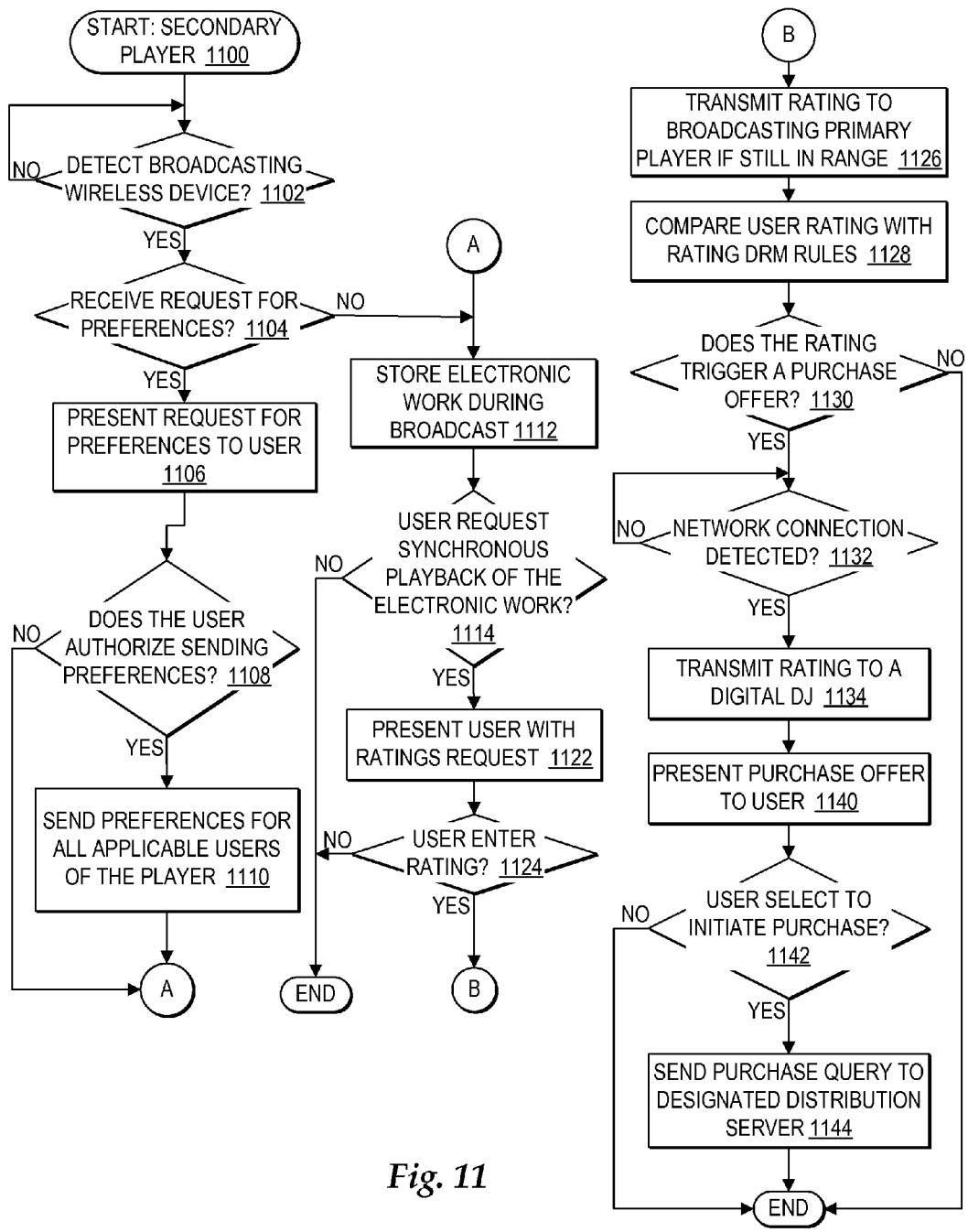
FIG. 11 is a high level logic flowchart of a process and program for controlling receipt of broadcast electronic works at a secondary player.

With reference now to FIG. 11, there is depicted a high level logic flowchart of a process and program for controlling receipt of broadcast electronic works at a secondary player. As illustrated, the process starts at block 1100 and thereafter proceeds to block 1102. Block 1102 illustrates a determination whether a broadcasting wireless device is detected. If a broadcasting wireless device is not detected, then the process iterates at block 1102. If a broadcasting wireless device is detected, then the process passes to block 1104. Block 1104 illustrates a determination whether a request for preferences is received. If a request for preferences is received, then the process passes to block 1106. If a request for preferences is not received, then the process passes to block 1112.

If the process passes to block 1106, a request is presented for the user to authorize sending preferences. Next, block 1108 depicts a determination whether the user authorizes sending preferences. If the user does not authorize sending preferences, then the process passes to block 1112. If the user does authorize sending preferences, then the process passes to block 1110. Block 1110 illustrates sending preferences for all applicable users of the player, and the process passes to block 1112. User preferences may be set by the device owner, the current user, or a group of users.

When the process passes to block 1112, the electronic work received at the secondary player may be stored, with DRM rules, during the broadcast. Alternatively, only the DRM rules or context may be stored or no information about the broadcast is stored. Next, block 1114 depicts a determination whether the user selects synchronous playback of the electronic work. The user may select synchronous playback. If the user does not request synchronous playback then the process ends. If the user does select playback, then the process passes to block 1122. Block 1122 depicts presenting the user with a ratings request. Thereafter, block 1124 illustrates a determination of whether the user enters a rating. If a user enters a rating, then the process passes to block 1126. If the user does not enter a rating within a particular time, then the process ends. Alternatively, if the user does not enter a rating within a particular time, a rating selection may be automatically assigned based on the user's preferences and previous ratings. Further, a user may not be presented with a ratings request, but rather a user may set a preference for ratings to always be automatically assigned based on the user's preferences and previous ratings.

Block 1126 depicts transmitting the rating to the broadcasting primary player if it is still within transmission range. Next, block 1128 illustrates comparing the user rating with the rating DRM rules. Thereafter, block 1130 depicts a determination whether the rating triggers a purchase offer. If the rating does not trigger a purchase offer, then the process ends. If the rating triggers a purchase offer, then the process passes to block 1132.

Block 1132 depicts a determination whether a network connection is detected. If a network connection is not detected, then the process iterates at block 1132. If a network connection is detected, then the process passes to block 1134. Block 1134 illustrates transmitting the rating to a digital DJ. Next, block 1140 depicts presenting a purchase offer to the user. Thereafter, block 1142 illustrates a determination whether the user selects to initiate the purchase. If the user does not select to initiate the purchase, then the process passes to block 1142. If the user selects to initiate the purchase, then the process passes to block 1144. Block 1144 depicts sending a purchase query to the designated distribution server, and the process ends.

Figure 12:
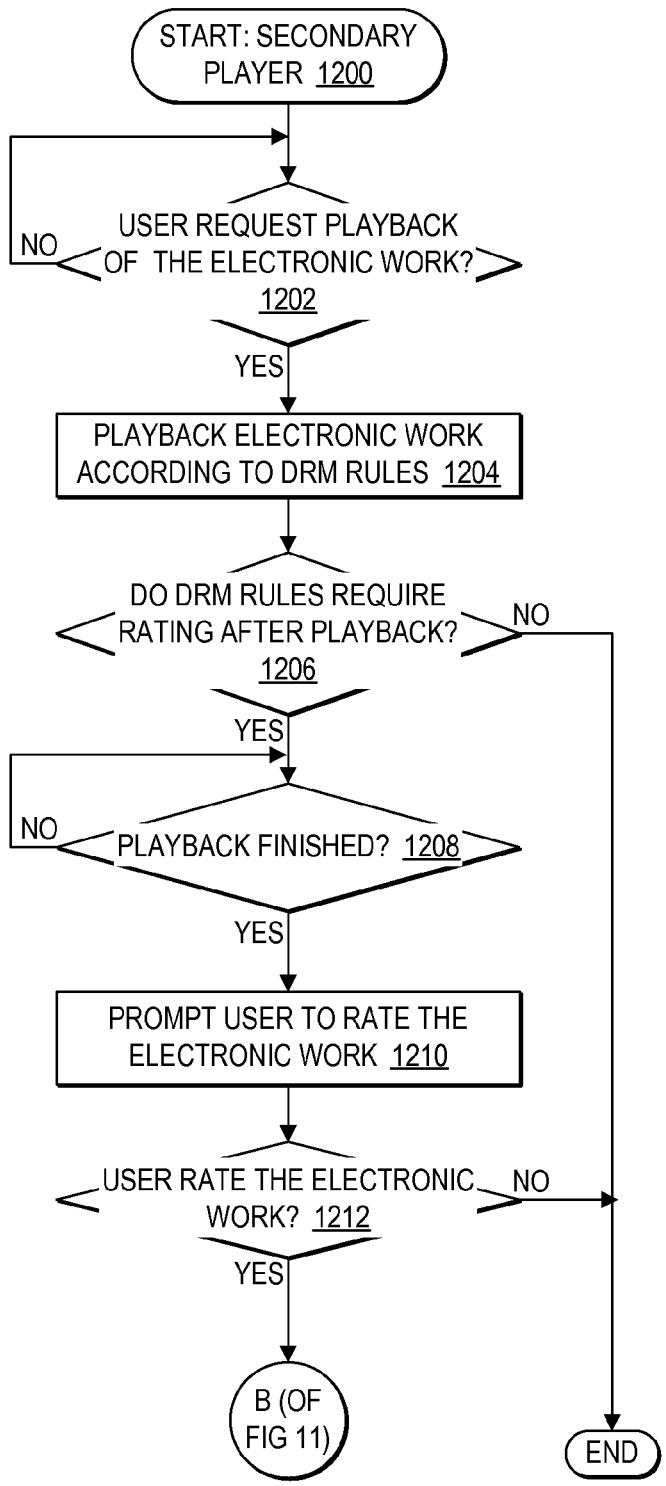
FIG. 12 is a high level logic flowchart of a process and program for controlling playback of stored samples of broadcast electronic works at a player.

Referring now to FIG. 12, there is illustrated a high level logic flowchart of a process and program for controlling playback of stored samples of broadcast electronic works at a player. As depicted, the process starts at block 1200 and thereafter proceeds to block 1202. Block 1202 depicts a determination whether a user request for playback of a stored electronic work is detected. If a user request for playback of a stored electronic work is not detected, then the process iterates at block 1202. If a user request for playback of a stored electronic work is detected, then the process passes to block 1204. Block 1204 depicts initiating playback of the electronic work according to the DRM rules. Thereafter, block 1206 illustrates a determination whether the DRM rules require a rating after playback. If the DRM rules do not require a rating after playback, then the process ends. If the DRM rules require a rating after playback, then the process passes to block 1208. Block 1208 depicts a determination whether playback is finished. The process iterates at block 1208 until playback is finished. Once playback is finished, then the process passes to block 1210. Block 1210 illustrates prompting the user to rate the electronic work. Next, block 1212 depicts a determination whether the user rating of the electronic work is received. If a user rating is not received, then the process ends after a period of time. If a user rating of the electronic work is received, then the process passes to identifier B of FIG. 11.

While the invention has been particularly shown and described with reference to a preferred embodiment, it will be understood by those skilled in the art that various changes in form and detail may be made therein without departing from the spirit and scope of the invention.

What is claimed is:

1. A method for responding to recipient ratings of wirelessly broadcast electronic works, comprising:
   receiving a wireless broadcast of an electronic work from a primary player at a secondary player;
   storing a sample of said electronic work at said secondary player;
   responsive to receiving a request for play of said stored sample of said electronic work, controlling playback of said stored sample of said electronic work;
   responsive to said playback of said stored sample of said electronic work from said secondary player, prompting a recipient of said electronic work to rate said electronic work;
   responsive to said recipient rating said electronic work with a favorable rating, triggering a purchase offer for said electronic work when said secondary player is connected to a network enabling access to a purchase server.

2. The method according to claim 1 for responding to recipient ratings of wirelessly broadcast electronic works, further comprising:
   enabling synchronous playback of said electronic work at said secondary player while said secondary player is within reception range of said primary player.

3. The method according to claim 1 for responding to recipient ratings of wirelessly broadcast electronic works, further comprising:
   receiving a digital rights rule designating a purchase server link for said purchase server with said wireless broadcast of said electronic work; and
   responsive to a recipient request to complete said purchase offer, automatically accessing said purchase server link via said network.

4. The method according to claim 1 for responding to recipient ratings of wirelessly broadcast electronic works, wherein said electronic work is one from among a musical work, a textual work, a video work, and a film work.

5. A method for responding to recipient ratings of wirelessly broadcast electronic works, comprising:
   receiving a wireless broadcast of an electronic work from a primary player at a secondary player;
   receiving a digital rights rule with said wireless broadcast of said electronic work, wherein said digital rights rule specifies what is a favorable rating;
   responsive to a playback of said electronic work from said secondary player, prompting a recipient of said electronic work to rate said electronic work; and
   responsive to said recipient rating said electronic work with the favorable rating, triggering a purchase offer for said electronic work when said secondary player is connected to a network enabling access to a purchase server.

6. A method for responding to recipient ratings of wirelessly broadcast electronic works, comprising:
   receiving a wireless broadcast of an electronic work from a primary player at a secondary player;
   responsive to a playback of said electronic work from said secondary player, prompting a recipient of said electronic work to rate said electronic work;
   responsive to said recipient rating said electronic work with a favorable rating, triggering a purchase offer for said electronic work when said secondary player is connected to a network enabling access to a purchase server; and responsive to a recipient not entering said rating, automatically assigning said rating based on preferences and previous ratings of said recipient.

7. A system for responding to recipient ratings of wirelessly broadcast electronic works, comprising:
 a secondary player operative to receive a wireless broadcast of an electronic work from a primary player;
 said secondary player operative to store a sample of said electronic work at said secondary player;
 said secondary player, responsive to receiving a request for play of said stored sample of said electronic work, operative to control playback of said stored sample of said electronic work;
 said secondary player, responsive to said playback of said stored sample of said electronic work from said secondary player, operative to require a recipient of said electronic work to rate said electronic work; and
 said secondary player, responsive to said recipient rating said electronic work with a favorable rating, operative to trigger a purchase offer for said electronic work when said secondary player is connected to a network enabling access to a purchase server.

8. The system according to claim 7 for responding to recipient ratings of wirelessly broadcast electronic works, further comprising said secondary player operative to enable synchronous playback of said electronic work at said secondary player while said secondary player is within reception range of said primary player.

9. The system according to claim 7 for responding to recipient ratings of wirelessly broadcast electronic works, further comprising said secondary player operative to receive a digital rights rules designating a purchase server link for said purchase server with said wireless broadcast of said electronic work; and
 said secondary player, responsive to a recipient request to complete said purchase offer, operative to automatically access said purchase server link via said network.

10. The system according to claim 7 for responding to recipient ratings of wirelessly broadcast electronic works, wherein said electronic work is one from among a musical work, a textual work, a video work, and a film work.

11. A system for responding to recipient ratings of wirelessly broadcast electronic works, comprising:
 a secondary player operative to receive a wireless broadcast of an electronic work from a primary player;
 said secondary player operative to receive a digital rights rule with said wireless broadcast of said electronic work, wherein said digital rights rule specifies what is said favorable rating;
 said secondary player, responsive to a playback of said electronic work from said secondary player, operative to require a recipient of said electronic work to rate said electronic work; and
 said secondary player, responsive to said recipient rating said electronic work with a favorable rating, operative to trigger a purchase offer for said electronic work when said secondary player is connected to a network enabling access to a purchase server.

12. A system for responding to recipient ratings of wirelessly broadcast electronic works, comprising:
 a secondary player operative to receive a wireless broadcast of an electronic work from a primary player;
 said secondary player, responsive to a playback of said electronic work from said secondary player, operative to require a recipient of said electronic work to rate said electronic work;
 said secondary player, responsive to said recipient rating said electronic work with a favorable rating, operative to trigger a purchase offer for said electronic work when said secondary player is connected to a network enabling access to a purchase server; and
 said secondary player, responsive to a recipient not entering said rating, operative to automatically assign said rating based on preferences and previous ratings of said recipient.

13. A computer program product for responding to recipient ratings of wirelessly broadcast electronic works, comprising:
 a non-transitory computer readable storage media;
 first program instructions to receive a wireless broadcast of an electronic work from a primary player at a secondary player;
 second program instructions to store a sample of said electronic work at said secondary player;
 third program instructions to control playback of said stored sample of said electronic work, responsive to receiving a request for play of said stored sample of said electronic work;
 fourth program instructions to require a recipient of said electronic work to rate said electronic work, responsive to a playback of said electronic work from said secondary player; and
 fifth program instructions to trigger a purchase offer for said electronic work when said secondary player is connected to a network enabling access to a purchase server, responsive to said recipient rating said electronic work with a favorable rating;
 wherein said first, second, third, fourth, and fifth program instructions are stored on said computer readable storage media.

14. The computer program product according to claim 13, further comprising:
 sixth program instructions to enable synchronous playback of said electronic work at said secondary player while said secondary player is within reception range of said primary player;
 wherein said sixth program instructions are stored on said computer readable storage media.

15. The computer program product according to claim 13, further comprising:
 sixth program instructions to receive a digital rights rule designating a purchase server link for said purchase server with said wireless broadcast of said electronic work; and
 seventh program instructions, responsive to a recipient request to complete said purchase offer, to automatically access said purchase server link via said network;
 wherein said sixth and seventh program instructions are stored on said computer readable storage media.

16. The computer program product according to claim 13, wherein said electronic work is one from among a musical work, a textual work, a video work, and a film work.

17. A computer program product for responding to recipient ratings of wirelessly broadcast electronic works, comprising:
 a non-transitory computer readable storage media;
 first program instructions to receive a wireless broadcast of an electronic work from a primary player at a secondary player;
 second program instruction to receive a digital rights rule with said wireless broadcast of said electronic work, wherein said digital rights rule specifies what is a favorable rating;

third program instructions to require a recipient of said electronic work to rate said electronic work, responsive to a playback of said electronic work from said secondary player; and fourth program instructions to trigger a purchase offer for said electronic work when said secondary player is connected to a network enabling access to a purchase server, responsive to said recipient rating said electronic work with said favorable rating;

wherein the first, second, third, and fourth program instructions are stored on said computer readable storage media.

18. A computer program product for responding to recipient ratings of wirelessly broadcast electronic works, comprising:

a non-transitory computer readable storage media;

first program instructions to receive a wireless broadcast of an electronic work from a primary player at a secondary player;

second program instructions to require a recipient of said electronic work to rate said electronic work, responsive to a playback of said electronic work from said secondary player;

third program instructions to trigger a purchase offer for said electronic work when said secondary player is connected to a network enabling access to a purchase server, responsive to said recipient rating said electronic work with a favorable rating;

fourth program instructions, responsive to a recipient not entering said rating, to automatically assign said rating based on preferences and previous ratings of said recipient;

wherein the first, second, third, and fourth program instructions are stored on said computer readable storage media.

* * * * *